US008281166B2

(12) United States Patent
Carroll

(10) Patent No.: US 8,281,166 B2
(45) Date of Patent: Oct. 2, 2012

(54) SYSTEM AND METHOD FOR COMPUTER POWER CONTROL

(75) Inventor: Ted A. Carroll, Seattle, WA (US)

(73) Assignee: Virdiem Corporation, Seattle, WA (US)

( * ) Notice: Subject to any disclaimer, the term of this patent is extended or adjusted under 35 U.S.C. 154(b) by 679 days.

(21) Appl. No.: 12/400,696

(22) Filed: Mar. 9, 2009

(65) Prior Publication Data
US 2009/0228725 A1 Sep. 10, 2009

Related U.S. Application Data

(60) Provisional application No. 61/035,307, filed on Mar. 10, 2008.

(51) Int. Cl.
G06F 1/00 (2006.01)
G06F 15/18 (2006.01)

(52) U.S. Cl. ........... 713/310; 713/300; 713/323; 706/12

(58) Field of Classification Search .................. 713/310, 713/323, 324, 300; 706/12
See application file for complete search history.

(56) References Cited

U.S. PATENT DOCUMENTS

| 5,933,647 | A | 8/1999 | Aronberg et al. | |
| 6,260,111 | B1 | 7/2001 | Craig et al. | |
| 6,408,395 | B1 | 6/2002 | Sugahara et al. | |
| 6,654,895 | B1 * | 11/2003 | Henkhaus et al. | 713/320 |
| 6,801,811 | B2 * | 10/2004 | Ranganathan et al. | 700/22 |
| 6,892,313 | B1 * | 5/2005 | Codilian et al. | 713/323 |
| 6,986,064 | B2 * | 1/2006 | Yoshimoto et al. | 713/300 |
| 7,171,458 | B2 | 1/2007 | Brown et al. | |
| 7,260,106 | B2 * | 8/2007 | Yavatkar et al. | 370/428 |
| 7,308,591 | B2 * | 12/2007 | Dubinsky | 713/324 |
| 7,472,298 | B1 * | 12/2008 | Kimmel et al. | 713/320 |
| 7,752,470 | B2 * | 7/2010 | Huang et al. | 713/310 |
| 8,055,915 | B2 * | 11/2011 | Klazynski et al. | 713/300 |
| 2003/0005341 | A1 * | 1/2003 | Terunuma | 713/310 |
| 2005/0268131 | A1 * | 12/2005 | Matsunobu | 713/323 |
| 2006/0224579 | A1 * | 10/2006 | Zheng | 707/5 |
| 2006/0259621 | A1 * | 11/2006 | Ranganathan et al. | 709/226 |

(Continued)

FOREIGN PATENT DOCUMENTS
EP 1850564 A1 * 10/2007
(Continued)

OTHER PUBLICATIONS

"NN9508187: Intelligent Power Control Method", Aug. 1, 1995, IBM, IBM Technical Disclosure Bulletin, vol. 38, Iss. 8, pp. 187-188.*

(Continued)

Primary Examiner — Faisal M Zaman
(74) Attorney, Agent, or Firm — Lowe Graham Jones PLLC

(57) ABSTRACT

Provided herein is a computer implemented system for managing power supply for an electronic device. The system includes computer a learning component that is trained and constructs models according to usage patterns of the electronic device, a component providing a first phase of model building relating to usage of the electronic device; and a forecasting component that employs the learning component and models to generate predictions relating to usage of the electronic device.

22 Claims, 2 Drawing Sheets

U.S. PATENT DOCUMENTS

| | | | | |
|---|---|---|---|---|
| 2006/0259803 A1* | 11/2006 | Edwards et al. | | 713/320 |
| 2007/0263246 A1* | 11/2007 | Bressan et al. | | 358/1.15 |
| 2008/0005736 A1* | 1/2008 | Apacible et al. | | 718/100 |
| 2008/0028239 A1* | 1/2008 | Rapps et al. | | 713/300 |
| 2010/0241888 A1* | 9/2010 | Kaneko et al. | | 713/324 |
| 2011/0004575 A1* | 1/2011 | Yang et al. | | 706/12 |
| 2011/0231320 A1* | 9/2011 | Irving | | 705/80 |
| 2011/0296220 A1* | 12/2011 | Arai | | 713/323 |
| 2012/0116600 A1* | 5/2012 | Schmid et al. | | 700/291 |

FOREIGN PATENT DOCUMENTS

| | | | | |
|---|---|---|---|---|
| JP | 2002312079 | A | * | 10/2002 |
| JP | 2003169462 | A | * | 6/2003 |
| JP | 2003345469 | A | * | 12/2003 |
| JP | 2007198994 | A | * | 8/2007 |

OTHER PUBLICATIONS

Jian Qiu; Bing Lin; Peng Liu; Song Zhang; Guojun Dai; , "Energy Level Based Transmission Power Control Scheme for Energy Harvesting WSNs," Global Telecommunications Conference (GLOBECOM 2011), 2011 IEEE , pp. 1-6, Dec. 5-9, 2011.*

Ren, Z.; Krogh, B.H.; Marculescu, R.; , "Hierarchical adaptive dynamic power management," Computers, IEEE Transactions on , vol. 54, No. 4, pp. 409-420, Apr. 2005.*

Minsoo Lee; Yoonsik Uhm; Yong Kim; Gwanyeon Kim; Sehyun Park; , "Intelligent power management device with middleware based living pattern learning for power reduction," Consumer Electronics, IEEE Transactions on , vol. 55, No. 4, pp. 2081-2089, Nov. 2009.*

* cited by examiner

SYSTEM AND METHOD FOR COMPUTER POWER CONTROL

CROSS-REFERENCE TO RELATED APPLICATIONS

This application claims the benefit of U.S. Provisional Application No. 61/035,307, filed Mar. 10, 2008, which application is incorporated herein by reference.

BRIEF SUMMARY OF THE INVENTION

One embodiment provides a computer implemented system for managing power supply for an electronic device, comprising the following computer executable components: a learning component that is trained and constructs models according to usage patterns of the electronic device, a component providing a first phase of model building relating to usage of the electronic device; and a forecasting component that employs the learning component and models to generate predictions relating to usage of the electronic device.

Another embodiment provides a system wherein the electronic device is a computer.

Yet another embodiment provides a system wherein the forecasting component generates a predicted usage profile.

A further embodiment provides a system wherein the predicted usage profile is matched with a power profile and components of the computer are powered on or off based on the predicted usage profile.

Still another embodiment provides a system wherein the predicted usage profile comprises a discretization of usage data, whereby the size of usage tables is reduced.

The systems and methods provided herein contemplate other methods of quantization of data. One advantage of such methods is reduction in the size of the tables required for implementing some of the features described herein.

One embodiment provides a system the predicted usage profile comprises states selected from "unused," and "used".

In one embodiment, the system may employ a user-configured power usage scheme when the predicted usage profile indicates an "unused" state and the system maintains the electronic device powered on or in an "on" state when the predicated usage profile is predicting a "used" state. One advantage is that the user is provided for a tool to adopt an aggressive power usage scheme while taking advantage of the option provided by the system in suspending the user-configured power usage scheme when the system predicts a "used" state.

Still another embodiment provides a system wherein the predicted usage profile comprises states selected from one or more of "unused," "light usage," and "heavy usage".

A further embodiment provides a system wherein the power profile keeps all peripherals on and the system ready to use during a "heavy usage" period.

One embodiment provides a system wherein the predicted usage profile comprises indication of device "heavy usage" and selection of a power scheme that keeps all peripherals and the device on and ready to use.

Another embodiment provides a system wherein the predicted usage profile comprises indication of device "light usage" and selection of a power scheme that powers off some peripherals after a predetermined period of inactivity to conserve power.

Yet another embodiment provides a system wherein the predicted usage profile comprises indication of "unused" device, and selection of a power scheme that powers off or hibernates the entire system after a predetermined period of inactivity.

It should be noted that a particular power scheme may be applied as a result of the predicted profile.

In one embodiment the forecasting component determines complementary information relating to how long a system is expected to be in "heavy use," "light use" or "unused."

Another embodiment provides a system further comprising predicting a wake up profile whereby the system is powered on.

Another embodiment provides a system wherein the learning component includes one or more probabilistic learning models for reasoning about the usage states.

Yet another embodiment provides a system wherein the learning component includes one or more of a statistical model, a mathematical model, a simple model, a simple probability model, non-stationary Markov chains, a Bayesian dependency model, a naive Bayesian classifier, Bayesian networks, a times series model, a decision trees model, a Support Vector Machine (SVMs), a neural network, a probabilistic model, and a Hidden Markov Model.

Another embodiment provides a computer implemented method for managing power supply for an electronic device, comprising the following computer executable steps:
 i) providing historical usage data;
 ii) training a learning component to construct models according to usage patterns of the electronic device,
 iii) providing a first phase of model building relating to usage of the electronic device;
 iv) generating predicted usage profile relating to usage of the electronic device; and
 v) incorporating the usage profile into a power scheme for power supply to the device.

Another embodiment provides a method wherein the electronic device is a computer.

Another embodiment provides a method further comprising discretization of usage data, whereby the size of usage tables is reduced.

One embodiment provides a system the predicted usage profile comprises states selected from "unused," and "used".

Another embodiment provides a method wherein the predicted usage profile comprises states selected from one or more of "unused," "light usage," and "heavy usage".

One embodiment provides a method wherein the predicted usage profile comprises indication of device "heavy usage" and selection of a power scheme that keeps all peripherals and the device on and ready to use.

Another embodiment provides a method wherein the predicted usage profile comprises indication of device "light usage" and selection of a power scheme that powers off some peripherals after a predetermined period of inactivity to conserve power.

Yet another embodiment provides a method wherein the predicted usage profile comprises indication of "unused" device, and selection of a power scheme that powers off or hibernates the entire system after a predetermined period of inactivity.

Another embodiment provides a method further comprising including complementary information relating to how long a system is expected to be in "heavy use," "light use" or "unused."

Another embodiment provides a method further comprising predicting a wake up profile whereby the system is powered on.

Another embodiment provides a method comprising one or more probabilistic learning models for reasoning about the usage states.

Another embodiment provides a method wherein the learning model includes one or more a statistical model, a mathematical model, a simple model, a simple probability model, non-stationary Markov chains, a Bayesian dependency model, a naive Bayesian classifier, Bayesian networks, a times series model, a decision trees model, a Support Vector Machine (SVMs), a neural network, a probabilistic model, and a Hidden Markov Model.

Another embodiment provides a method wherein the learning model includes a naive Bayesian model.

DETAILED DESCRIPTION OF THE INVENTION

Aspects of the present invention are described as follows.

Figure 1:
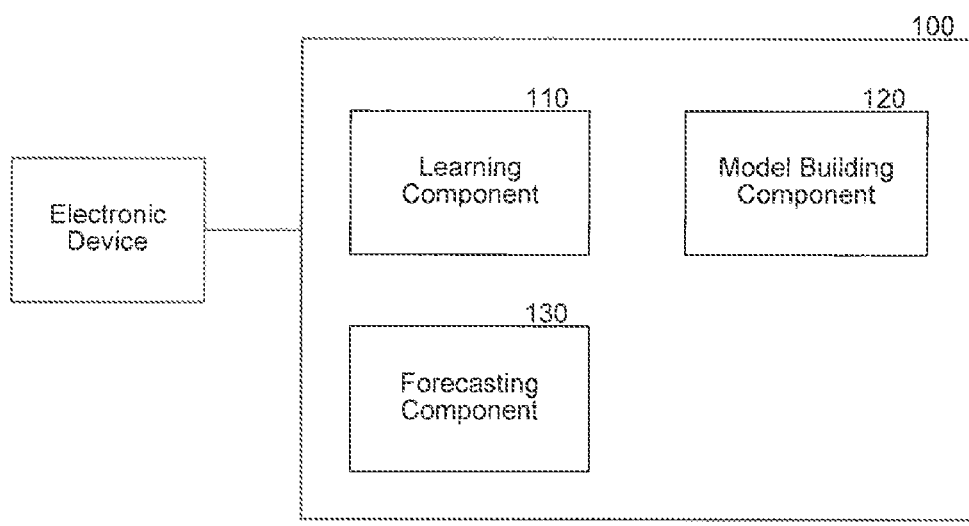
FIG. 1 is a block diagram of a system for managing power supply for an electronic device.
Figure 2:
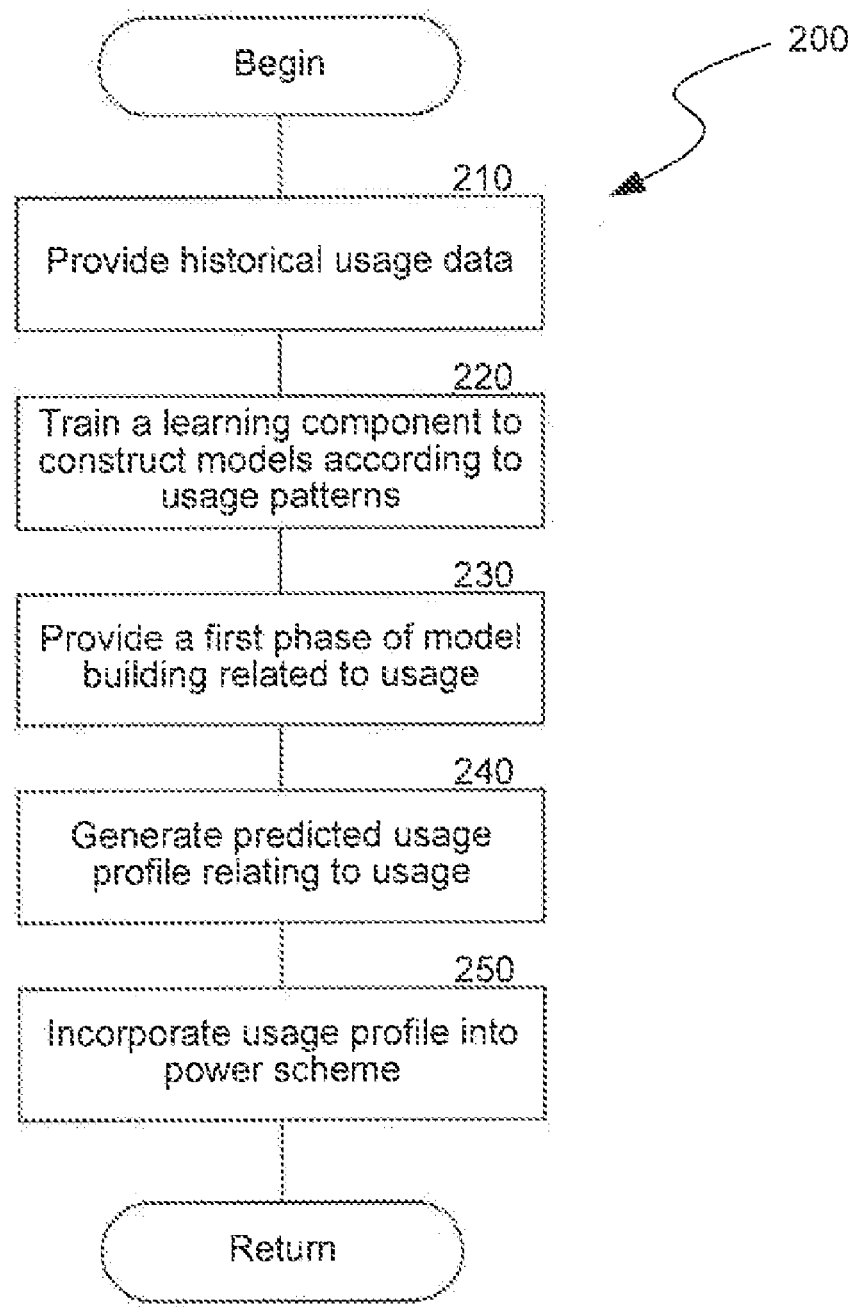
FIG. 2 is a flow diagram depicting steps performed by a system for managing power supply for an electronic device.

One embodiment provides a computer implemented system for managing power supply for an electronic device. FIG. 2 is a block diagram of a system 100 for managing power supply for an electronic device. The system comprises the following computer executable components: a learning component 110 that is trained and constructs models according to usage patterns of the electronic device, a model building component 120, which provides a first phase of model building relating to usage of the electronic device; and a forecasting component 130 that employs the learning component and models to generate predictions relating to usage of the electronic device.

Another embodiment provides a system wherein the electronic device is a computer.

Yet another embodiment provides a system wherein the forecasting component generates a predicted usage profile.

A further embodiment provides a system wherein the predicted usage profile is matched with a power profile and components of the computer are powered on or off based on the predicted usage profile.

Still another embodiment provides a system wherein the predicted usage profile comprises a discretization of usage data, whereby the size of usage tables is reduced.

The systems and methods provided herein contemplate other methods of quantization of data. One advantage of such methods is reduction in the size of the tables required for implementing some of the features described herein.

One embodiment provides a system the predicted usage profile comprises states selected from "unused," and "used".

In one embodiment, the system may employ a user-configured power usage scheme when the predicted usage profile indicates an "unused" state and the system maintains the electronic device powered on or in an "on" state when the predicated usage profile is predicting a "used" state. One advantage is that the user is provided for a tool to adopt an aggressive power usage scheme while taking advantage of the option provided by the system in suspending the user-configured power usage scheme when the system predicts a "used" state.

Still another embodiment provides a system wherein the predicted usage profile comprises states selected from one or more of "unused," "light usage," and "heavy usage".

A further embodiment provides a system wherein the power profile keeps all peripherals on and the system ready to use during a "heavy usage" period.

One embodiment provides a system wherein the predicted usage profile comprises indication of device "heavy usage" and selection of a power scheme that keeps all peripherals and the device on and ready to use.

Another embodiment provides a system wherein the predicted usage profile comprises indication of device "light usage" and selection of a power scheme that powers off some peripherals after a predetermined period of inactivity to conserve power.

Yet another embodiment provides a system wherein the predicted usage profile comprises indication of "unused" device, and selection of a power scheme that powers off or hibernates the entire system after a predetermined period of inactivity.

It should be noted that a particular power scheme may be applied as a result of the predicted profile.

In one embodiment the forecasting component determines complementary information relating to how long a system is expected to be in "heavy use," "light use" or "unused."

Another embodiment provides a system further comprising predicting a wake up profile whereby the system is powered on.

Another embodiment provides a system wherein the learning component includes one or more probabilistic learning models for reasoning about the usage states.

Yet another embodiment provides a system wherein the learning component includes one or more of a statistical model, a mathematical model, a simple model, a simple probability model, non-stationary Markov chains, a Bayesian dependency model, a naive Bayesian classifier, Bayesian networks, a times series model, a decision trees model, a Support Vector Machine (SVMs), a neural network, a probabilistic model, and a Hidden Markov Model.

Another embodiment provides a system wherein the learning component includes a naive Bayesian model.

In one embodiment the system assumes a variable $T_i$ for the $i^{th}$ time period and calculates $P(T_{n+1}|T_1, T_2, \ldots T_n)$ to compute usage probability.

In another embodiment the system calculates $P(T_{n+1}|T_1, T_2, \ldots T_n)$ as follows:

$$P(T_{n+1} | T_1, T_2, \ldots T_n) = \frac{P(T_1, \ldots, T_{n+1})}{P(T_1, \ldots, T_n)}$$

$$= \frac{P(T_1 | T_2 \ldots T_{n+1}) P(T_2 \ldots T_{n+1})}{P(T_1, \ldots, T_n)}$$

$$= \frac{P(T_1 | T_2 \ldots T_{n+1})}{P(T_1, \ldots, T_n)}$$

$$= \frac{P(T_2 | T_3 \ldots T_{n+1}) \ldots P(T_n | T_{n+1}) P(T_n + 1)}{P(T_1, \ldots, T_n)}.$$

In Still another embodiment the system further includes the assumption:

$$P(T_i | T_{i+1}, T_{i+2}, \ldots T_{n+1}) = P(T_i | T_{i+1}),$$

and calculates $$P(T_{n+1} | T_1, T_2, \ldots T_n) \approx \frac{P(T_{n+1}) \prod_{i=1}^{n} P(T_i | T_{i+1})}{P(T_1, \ldots, T_n)}.$$

In yet another embodiment the systems evaluates the likelihood of usage status of the computer by evaluating the ratio:

$$\frac{P(T_{n+1}=1 \mid T_1, T_2, \ldots T_n)}{P(T_{n+1}=0 \mid T_1, T_2, \ldots T_n)}$$

Where $T_i=1$ indicates the computer is used and $T_i=0$ indicates the computer is unused, whereby the computer is more likely to be used than not when the value of the ratio is greater than 1.

Another embodiment provides a system wherein evaluating the likelihood of usage comprises calculating the ratio:

$$\frac{P(T_{n+1}=1 \mid T_1, T_2, \ldots T_n)}{P(T_{n+1}=0 \mid T_1, T_2, \ldots T_n)} \approx \frac{P(T_{n+1}=1)\prod_{i=1}^{n} P(T_i \mid T_{n+1}=1)}{P(T_{n+1}=0)\prod_{i=1}^{n} P(T_i \mid T_{n+1}=0)}.$$

Another embodiment provides a system wherein evaluating the likelihood of usage comprises calculating the logarithm of the ratio calculated above.

Another embodiment provides a system wherein evaluating the likelihood of usage comprises including one or more additional variables.

Another embodiment provides a system wherein evaluating the likelihood of usage comprises including an additional variable to reflect a particular day of the week and evaluating the ratio:

$$\frac{P(T_{n+1}=1)P(W \mid T_{n+1}=0)\prod_{i=1}^{n} P(T_i \mid T_{n+1}=1)}{P(T_{n+1}=0)P(W \mid T_{n+1}=0)\prod_{i=1}^{n} P(T_i \mid T_{n+1}=0)} \quad (2)$$

Wherein W=1; 2; 3; 4; 5; 6; 7 and represent a day of the week.

Another embodiment provides a system wherein evaluating the likelihood of usage comprises collecting a historical value for $P(W|T_{n+1})$.

Another embodiment provides a system wherein evaluating the likelihood of usage comprises including an additional variable to reflect usage of one or more external resource.

The systems and methods provided herein contemplate incorporation of information obtained from a myriad of external resources. For example, and without limitation, such resources may include information relating to the presence or absence of Bluetooth devices, integration with building access control, integration with building managements systems, information obtained from sensors (e.g.; sensors associated with building management systems), and use or lack of usage of other systems.

Another embodiment provides a system wherein evaluating the likelihood of usage comprises including an additional variable to reflect one or more of:
  i. meeting information from calendaring software like Microsoft Outlook;
  ii. day of week;
  iii. day of quarter;
  iv. holiday information;
  v. usage of another device or system connected through a network;
  vi. presence or absence of a Bluetooth device; and
  vii. information from a building management or access control device.

Another embodiment provides a system wherein the probabilistic learning model uses a discrete time period repeated over a predetermined total period of time.

In accordance with the subject systems and methods, the time period is selected after analysis of the usage patterns. For example, the time period is selected so that it is in sync with the natural usage patterns of the system Another embodiment provides a system wherein the probabilistic learning model uses a discrete time period repeated over a total period of 8 hours, 12 hours, 16, hours, 24 hours, 30 hours, 36 hours, 48 hours, 60 hours or 72 hours.

Another embodiment provides a system further comprising a slider component which allows a user to set a required likelihood that the device is in a selected usage state before applying a power scheme associated with the selected usage state.

In accordance with the present systems and methods, the slider provides several advantages. For example, the slider allows the user to adjust a tradeoff between accuracy-convenience and power savings. Allowing a low threshold for activating a power profile based on the predicted usage will tend to optimize savings but may lead to less convenience as users may need to override the applied power scheme. On the other hand, raising the threshold for applying the power scheme would tend to reduce the s Another embodiment provides a system wherein the required likelihood is set by a user to reflect a bias towards power savings.

One embodiment provides a system wherein the slider comprises a selected value between 0 and 100; whereby a determination that a logarithm ratio computed above exceeds the selected value results in a prediction that the device is in the state indicated by the predicted profile.

Another embodiment provides a computer implemented method for managing power supply for an electronic device. FIG. 2 is a flow diagram of a process 200 for managing power supply for an electronic device. The process includes the following:
  i) at a block 210, the system provides historical usage data;
  ii) at a block 220, the system trains a learning component to construct models according to usage patterns of the electronic device;
  iii) at a block 230, the system provides a first phase of model building relating to usage of the electronic device;
  iv) at a block 240, the system generates a predicted usage profile relating to usage of the electronic device; and
  v) at a block 250, the system incorporates the usage profile into a power scheme for power supply to the device.

Another embodiment provides a method wherein the electronic device is a computer.

Another embodiment provides a method further comprising discretization of usage data, whereby the size of usage tables is reduced.

One embodiment provides a system the predicted usage profile comprises states selected from "unused," and "used".

Another embodiment provides a method wherein the predicted usage profile comprises states selected from one or more of "unused," "light usage," and "heavy usage".

One embodiment provides a method wherein the predicted usage profile comprises indication of device "heavy usage" and selection of a power scheme that keeps all peripherals and the device on and ready to use.

Another embodiment provides a method wherein the predicted usage profile comprises indication of device "light usage" and selection of a power scheme that powers off some peripherals after a predetermined period of inactivity to conserve power.

Yet another embodiment provides a method wherein the predicted usage profile comprises indication of "unused" device, and selection of a power scheme that powers off or hibernates the entire system after a predetermined period of inactivity.

Another embodiment provides a method further comprising including complementary information relating to how long a system is expected to be in "heavy use," "light use" or "unused."

Another embodiment provides a method further comprising predicting a wake up profile whereby the system is powered on.

Another embodiment provides a method comprising one or more probabilistic learning models for reasoning about the usage states.

Another embodiment provides a method wherein the learning model includes one or more a statistical model, a mathematical model, a simple model, a simple probability model, non-stationary Markov chains, a Bayesian dependency model, a naive Bayesian classifier, Bayesian networks, a times series model, a decision trees model, a Support Vector Machine (SVMs), a neural network, a probabilistic model, and a Hidden Markov Model.

Another embodiment provides a method wherein the learning model includes a naive Bayesian model.

Another embodiment provides a method wherein the method assumes a variable $T_i$ for the $i^{th}$ time period and calculates $P(T_{n+1}|T_1, T_2, \ldots T_n)$ to compute usage probability.

Another embodiment provides a method comprising calculating $P(T_{n+1}|T_1, T_2, \ldots T_n)$ as follows:

$$P(T_{n+1} | T_1, T_2, \ldots T_n) = \frac{P(T_1, \ldots, T_{n+1})}{P(T_1, \ldots, T_n)}$$

$$= \frac{P(T_1 | T_2 \ldots T_{n+1})P(T_2 \ldots T_{n+1})}{P(T_1, \ldots, T_n)}$$

$$= \frac{P(T_1 | T_2 \ldots T_{n+1}) P(T_2 | T_3 \ldots T_{n+1}) \ldots P(T_n | T_{n+1})P(T_n + 1)}{P(T_1, \ldots, T_n)}.$$

Another embodiment provides a method wherein the method further includes the assumption:

$$P(T_i | T_{i+1}, T_{i+2}, \ldots T_{n+1}) = P(T_i | T_{i+1}),$$

and calculates $$P(T_{n+1} | T_1, T_2, \ldots T_n) \approx \frac{P(T_{n+1})\prod_{i=1}^{n} P(T_i | T_{n+1})}{P(T_1, \ldots, T_n)}.$$

Another embodiment provides a method comprising evaluating the likelihood of usage status of the computer by evaluating the ratio:

$$\frac{P(T_{n+1} = 1 | T_1, T_2, \ldots T_n)}{P(T_{n+1} = 0 | T_1, T_2, \ldots T_n)}$$

Where $T_i=1$ indicates the computer is used and $T_i=0$ indicates the computer is unused, whereby the computer is more likely to be used than not when the value of the ratio is greater than 1.

Another embodiment provides a method wherein evaluating the likelihood of usage comprises calculating the ratio:

$$\frac{P(T_{n+1} = 1 | T_1, T_2, \ldots T_n)}{P(T_{n+1} = 0 | T_1, T_2, \ldots T_n)} \approx \frac{P(T_{n+1} = 1)\prod_{i=1}^{n} P(T_i | T_{n+1} = 1)}{P(T_{n+1} = 0)\prod_{i=1}^{n} P(T_i | T_{n+1} = 0)}.$$

Another embodiment provides a method wherein evaluating the likelihood of usage comprises calculating the logarithm of the ratio calculated above.

Another embodiment provides a method wherein evaluating the likelihood of usage comprises including one or more additional variables.

Another embodiment provides a method wherein evaluating the likelihood of usage comprises including an additional variable to reflect a particular day of the week and evaluating the ratio:

$$\frac{P(T_{n+1} = 1)P(W | T_{n+1} = 0)\prod_{i=1}^{n} P(T_i | T_{n+1} = 1)}{P(T_{n+1} = 0)P(W | T_{n+1} = 0)\prod_{i=1}^{n} P(T_i | T_{n+1} = 0)} \quad (2)$$

Wherein W=1; 2; 3; 4; 5; 6; 7 and represent a day of the week.

Another embodiment provides a method wherein evaluating the likelihood of usage comprises collecting a historical value for $P(W|T_{n+1})$.

Another embodiment provides a method wherein evaluating the likelihood of usage comprises including an additional variable to reflect usage of one or more external resource.

Another embodiment provides a method wherein evaluating the likelihood of usage comprises including an additional variable to reflect one or more of:
 i. meeting information from calendaring software like Microsoft Outlook;
 ii. day of week;
 iii. day of quarter;
 iv. holiday information;
 v. usage of another device or system connected through a network;
 vi. presence or absence of a Bluetooth device; and
 vii. information from a building management or access control device.

Another embodiment provides a method wherein the probabilistic learning model uses a discrete time period repeated over a predetermined total period of time.

Another embodiment provides a method wherein the probabilistic learning model uses a discrete time period repeated over a total period of 8 hours, 12 hours, 16, hours, 24 hours, 30 hours, 36 hours, 48 hours, 60 hours or 72 hours.

Another embodiment provides a method further comprising providing a slider component which allows a user to set a required likelihood that the device is in a selected usage state before applying a power scheme associated with the selected usage state.

Another embodiment provides a method wherein the required likelihood is set by a user to reflect a bias towards power savings.

Another embodiment provides a method wherein the slider comprises a selected value between 0 and 100; whereby a determination that a logarithm ratio computed above exceeds the selected value results in a prediction that the device is in the state indicated by the predicted profile.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A computer implemented system for managing power supply for an electronic device, comprising the following computer executable components:
   a learning component that is trained and constructs models according to usage patterns of the electronic device;
   a component providing a first phase of model building relating to usage of the electronic device; and
   a forecasting component that employs the learning component and models to generate predictions relating to usage of the electronic device,
   wherein the electronic device is a computer,
   wherein the predicted usage profile comprises a discretization of usage data, whereby the size of usage tables is reduced,
   wherein the learning component includes one or more probabilistic learning models for reasoning about the usage states,
   wherein the learning component includes a naïve Bayesian model, and
   wherein the system assumes a variable $T_i$ for the $i^{th}$ time period and calculates $P(T_{n+1}|T_1, T_2, \ldots T_n)$ to compute usage probability.

2. A computer implemented system for managing power supply for an electronic device, comprising the following computer executable components:
   a learning component that is trained and constructs models according to usage patterns of the electronic device;
   a component providing a first phase of model building relating to usage of the electronic device; and
   a forecasting component that employs the learning component and models to generate predictions relating to usage of the electronic device,
   wherein the electronic device is a computer,
   wherein the predicted usage profile comprises a discretization of usage data, whereby the size of usage tables is reduced,
   wherein the learning component includes one or more probabilistic learning models for reasoning about the usage states,
   wherein the learning component includes a naïve Bayesian model, and wherein the system calculates $P(T_{n+1}|T_1, T_2, \ldots T_n)$ as follows:

$$P(T_{n+1}|T_1, T_2, \ldots T_n) = \frac{P(T_1, \ldots, T_{n+1})}{P(T_1, \ldots, T_n)}$$

$$= \frac{P(T_1|T_2 \ldots T_{n+1})P(T_2 \ldots T_{n+1})}{P(T_1, \ldots, T_n)}$$

$$= \frac{P(T_1|T_2 \ldots T_{n+1})}{P(T_2|T_3 \ldots T_{n+1}) \ldots P(T_n|T_{n+1})P(T_n+1)}{P(T_1, \ldots, T_n)}.$$

3. The system of claim 2, wherein the system further includes the assumption:

$$P(T_i|T_{i+1}, T_{i+2}, \ldots T_{n+1}) = P(T_i|T_{i+1}),$$

and calculates $$P(T_{n+1}|T_1, T_2, \ldots T_n) \approx \frac{P(T_{n+1})\prod_{i=1}^{n} P(T_i|T_{n+1})}{P(T_1, \ldots, T_n)}.$$

4. The system of claim 3, wherein the systems evaluates the likelihood of usage status of the computer by evaluating the ratio:

$$\frac{P(T_{n+1} = 1|T_1, T_2, \ldots T_n)}{P(T_{n+1} = 0|T_1, T_2, \ldots T_n)}$$

Where $T_i=1$ indicates the computer is used and $T_i=0$ indicates the computer is unused, whereby the computer is more likely to be used than not when the value of the ratio is greater than 1.

5. The system of claim 4, wherein evaluating the likelihood of usage comprises calculating the ratio:

$$\frac{P(T_{n+1} = 1|T_1, T_2, \ldots T_n)}{P(T_{n+1} = 0|T_1, T_2, \ldots T_n)} \approx \frac{P(T_{n+1} = 1)\prod_{i=1}^{n} P(T_i|T_{n+1} = 1)}{P(T_{n+1} = 0)\prod_{i=1}^{n} P(T_i|T_{n+1} = 0)}.$$

6. The system of claim 5, wherein evaluating the likelihood of usage comprises calculating the logarithm of the ratio:

$$P(T_{n+1}|T_1, T_2, \ldots T_n) \approx \frac{P(T_{n+1})\prod_{i=1}^{n} P(T_i|T_{n+1})}{P(T_1, \ldots, T_n)}.$$

7. The system of claim 5, wherein evaluating the likelihood of usage comprises including one or more additional variables.

8. The system of claim 7, wherein evaluating the likelihood of usage comprises including an additional variable to reflect a particular day of the week and evaluating the ratio:

$$\frac{P(T_{n+1}=1)P(W|T_{n+1}=0)\prod_{i=1}^{n} P(T_i|T_{n+1}=1)}{P(T_{n+1}=0)P(W|T_{n+1}=0)\prod_{i=1}^{n} P(T_i|T_{n+1}=0)} \quad (2)$$

Wherein W=1; 2; 3; 4; 5; 6; 7 and represent a day of the week.

9. The system of claim 8, wherein evaluating the likelihood of usage comprises collecting a historical value for $P(W|T_{n+1})$.

10. The system of claim 7, wherein evaluating the likelihood of usage comprises including an additional variable to reflect usage of one or more external resource.

11. The system of claim 10, wherein evaluating the likelihood of usage comprises including an additional variable to reflect one or more of:
 i. meeting information from calendaring software like Microsoft Outlook;
 ii. day of week;
 iii. day of quarter;
 iv. holiday information;
 v. usage of another device or system connected through a network;
 vi. presence or absence of a Bluetooth device; and
 vii. information from a building management or access control device.

12. A computer implemented method for managing power supply for an electronic device, comprising the following computer executable steps:
 i) providing historical usage data;
 ii) training a learning component to construct models according to usage patterns of the electronic device,
 iii) providing a first phase of model building relating to usage of the electronic device;
 iv) generating predicted usage profile relating to usage of the electronic device; and
 v) incorporating the usage profile into a power scheme for power supply to the device,
  wherein the method utilizes one or more probabilistic learning models for reasoning about the usage states,
  wherein the learning model includes a naïve Bayesian model, and
  wherein the method assumes a variable $T_i$ for the $i^{th}$ time period and calculates $P(T_{n+1}|T_1, T_2, \ldots T_n)$ to compute usage probability.

13. The method of claim 12, comprising calculating $P(T_{n+1}|T_1, T_2, \ldots T_n)$ as follows:

$$P(T_{n+1}|T_1, T_2, \ldots T_n) = \frac{P(T_1, \ldots, T_{n+1})}{P(T_1, \ldots, T_n)}$$

$$= \frac{P(T_1|T_2 \ldots T_{n+1})P(T_2 \ldots T_{n+1})}{P(T_1, \ldots, T_n)}$$

$$= \frac{P(T_1|T_2 \ldots T_{n+1}) \ldots P(T_n|T_{n+1})P(T_n+1)}{P(T_1, \ldots, T_n)}.$$

14. The method of claim 13, wherein the method further includes the assumption:

$$P(T_i|T_{i+1}, T_{i+2}, \ldots T_{n+1}) = P(T_i|T_{i+1}),$$

and calculates $$P(T_{n+1}|T_1, T_2, \ldots T_n) \approx \frac{P(T_{n+1})\prod_{i=1}^{n} P(T_i|T_{n+1})}{P(T_1, \ldots, T_n)}.$$

15. The method of claim 14, comprising evaluating the likelihood of usage status of the computer by evaluating the ratio:

$$\frac{P(T_{n+1}=1|T_1, T_2, \ldots T_n)}{P(T_{n+1}=0|T_1, T_2, \ldots T_n)}$$

Where $T_i=1$ indicates the computer is used and $T_i=0$ indicates the computer is unused, whereby the computer is more likely to be used than not when the value of the ratio is greater than 1.

16. The method of claim 15, wherein evaluating the likelihood of usage comprises calculating the ratio:

$$\frac{P(T_{n+1}=1|T_1, T_2, \ldots T_n)}{P(T_{n+1}=0|T_1, T_2, \ldots T_n)} \approx \frac{P(T_{n+1}=1)\prod_{i=1}^{n} P(T_i|T_{n+1}=1)}{P(T_{n+1}=0)\prod_{i=1}^{n} P(T_i|T_{n+1}=0)}.$$

17. The method of claim 16, wherein evaluating the likelihood of usage comprises calculating the logarithm of the ratio:

$$P(T_{n+1}|T_1, T_2, \ldots T_n) \approx \frac{P(T_{n+1})\prod_{i=1}^{n} P(Ti|T_{n+1})}{P(T_1, \ldots, T_n)}.$$

18. The method of claim 17, wherein evaluating the likelihood of usage comprises including one or more additional variables.

19. The method of claim 18, wherein evaluating the likelihood of usage comprises including an additional variable to reflect a particular day of the week and evaluating the ratio:

$$\frac{P(T_{n+1}=1)P(W|T_{n+1}=0)\prod_{i=1}^{n} P(T_i|T_{n+1}=1)}{P(T_{n+1}=0)P(W|T_{n+1}=0)\prod_{i=1}^{n} P(T_i|T_{n+1}=0)} \quad (2)$$

Wherein W=1; 2; 3; 4; 5; 6; 7 and represent a day of the week.

20. The method of claim 19, wherein evaluating the likelihood of usage comprises collecting a historical value for $P(W|T_{n+1})$.

21. The method of claim 18, wherein evaluating the likelihood of usage comprises including an additional variable to reflect one or more of:

i. meeting information from calendaring software like Microsoft Outlook;
ii. day of week;
iii. day of quarter;
iv. holiday information;
v. usage of another device or system connected through a network;
vi. presence or absence of a Bluetooth device; and
vii. information from a building management or access control device.

22. The method of claim 16, wherein evaluating the likelihood of usage comprises including an additional variable to reflect usage of one or more external resource.

* * * * *